US009805228B2

(12) United States Patent
Janssens

(10) Patent No.: US 9,805,228 B2
(45) Date of Patent: Oct. 31, 2017

(54) PROXIMITY CHECK FOR COMMUNICATION DEVICES

(71) Applicant: NXP B.V., Eindhoven (NL)

(72) Inventor: Pieter Janssens, Berchem (BE)

(73) Assignee: NXP B.V., Eindhoven (NL)

( * ) Notice: Subject to any disclaimer, the term of this patent is extended or adjusted under 35 U.S.C. 154(b) by 114 days.

(21) Appl. No.: 14/700,064

(22) Filed: Apr. 29, 2015

(65) Prior Publication Data

US 2015/0310234 A1    Oct. 29, 2015

(30) Foreign Application Priority Data

Apr. 29, 2014    (EP) .................................... 14166469

(51) Int. Cl.
*H04Q 5/22*    (2006.01)
*G06K 7/10*    (2006.01)
(Continued)

(52) U.S. Cl.
CPC ....... *G06K 7/10128* (2013.01); *H04B 5/0031* (2013.01); *H04B 5/0056* (2013.01);
(Continued)

(58) Field of Classification Search
CPC ...... G06K 9/6201; G06Q 30/06; H04L 63/07; H04L 63/0492
(Continued)

(56) References Cited

U.S. PATENT DOCUMENTS

| 4,897,661 A * | 1/1990 | Hiraiwa | ................ G01S 13/878 342/357.31 |
| 2007/0073513 A1* | 3/2007 | Posamentier | ......... G01S 13/751 702/150 |

(Continued)

FOREIGN PATENT DOCUMENTS

| DE | 10310869 A1 | 9/2004 |
| WO | WO-0183920 A1 | 11/2001 |
| WO | 2009/144534 A1 | 12/2009 |

OTHER PUBLICATIONS

European Search Report for European Application No. 14 17 6157 dated Aug. 25, 2015.
(Continued)

*Primary Examiner* — Vernal Brown

(57) ABSTRACT

There is described a method of checking whether a transponder device (220) is in proximity of a reader device (210), the method comprising (a) transmitting a first command (331) from the reader device to the transponder device, (b) in response to receiving the first command at the transponder device, transmitting a first response (332) to the reader device, the first response including an expected transponder device response time (pubRespTime) which is stored in a memory (224) of the transponder device, (c) transmitting a second command (333) from the reader device to the transponder device, (d) in response to receiving the second command at the transponder device, transmitting a second response (334) to the reader device, (e) at the reader device, determining the transponder device response time as (Continued)

the difference in time between transmitting the second command and receiving the second response from the transponder device, and (f) determining whether the determined transponder device response time matches the expected transponder device response time included in the first response. There is also described a reader device (210), a transponder device (220), and a contactless communication system (200).

16 Claims, 2 Drawing Sheets

(51) Int. Cl.
 *H04B 5/00* (2006.01)
 *H04L 29/06* (2006.01)
 *H04W 12/08* (2009.01)
(52) U.S. Cl.
 CPC ........ *H04L 63/0492* (2013.01); *H04L 63/107* (2013.01); *H04L 63/1475* (2013.01); *H04W 12/08* (2013.01)

(58) Field of Classification Search
 USPC ........................................................ 340/10.4
 See application file for complete search history.

(56) References Cited

U.S. PATENT DOCUMENTS

2009/0166419 A1* 7/2009 Patton .................. G06K 7/0008
 235/439
2011/0078549 A1* 3/2011 Thueringer ........... H04L 9/3271
 714/807

OTHER PUBLICATIONS

Francis, L. et al. "Practical Relay Attack on Contactless Transactions by Using NFC Mobile Phones", Information Security Group, 16 pgs (2005).
Hancke, G. "A Practical Relay Attack on ISO 14443 Proximity Cards", Univ. of Cambridge, 13 pgs (2005).
Hancke, G. P. et al. "An RFID Distance Bounding Protocol", Proceedings of the IEEE, Create-Net SecureComm 2005, 7 pgs, (Sep. 2005).

* cited by examiner

PROXIMITY CHECK FOR COMMUNICATION DEVICES

CROSS-REFERENCE TO RELATED APPLICATIONS

This application claims the priority under 35 U.S.C. §119 of European patent application no. 14166469.8, filed on Apr. 29, 2014, the contents of which are incorporated by reference herein.

FIELD OF THE INVENTION

The present invention relates to the field of proximity check for communication devices, more specifically to a method of checking whether a transponder device is in proximity of a reader device. Furthermore, the present invention relates to reader devices, transponder devices and contactless communication systems comprising such devices.

ART BACKGROUND

WO 2009/144534 A1 relates to measurement of a transponder device's (PD or Proximate Device) response time at a reader device (PCD or Proximity Coupling Device) and describes that proximity of the transponder device (i.e. that the transponder device is in proximity of the reader device) may be checked by comparing the measured transponder device response time with a predetermined threshold. Thereby, the risk of relay attacks may be reduced, i.e. attacks where another transponder device and another reader device that are both controlled by the attacker(s) are interposed between legitimate reader and transponder devices.

However, the above approach cannot prevent relay attacks in cases where the reader needs to manage a population of transponder devices with different response times (e.g. due to different implementations). For example, if the maximum response time of a valid transponder device implementation is 1 second and another valid transponder device implementation provides a valid transponder response after 750 ms, a 250 ms window will be available for relay. Such an early transponder response may e.g. be provided by different implementations (e.g. standalone vs. mobile).

Accordingly, there may be a need for an improved way of checking whether a transponder device is in proximity of a reader device, in particular an improvement that is capable of handling the above cases and which is easy to implement.

SUMMARY OF THE INVENTION

This need may be met by the subject matter according to the independent claims. Advantageous embodiments of the present invention are set forth in the dependent claims.

According to a first aspect there is provided a method of checking whether a transponder device is in proximity of a reader device, the method comprising (a) transmitting a first command from the reader device to the transponder device, (b) in response to receiving the first command at the transponder device, transmitting a first response to the reader device, the first response including an expected transponder device response time, (c) determining an actual transponder device response time, and (d) determining whether the determined actual transponder device response time fulfills a predetermined criterion relative to the expected transponder device response time included in the first response.

This aspect is based on the idea that the transponder device informs the reader device of an expected transponder device response time of the transponder device. Thereby, the reader device can determine whether the measured or actual transponder device response time fulfills a predetermined criterion relative to this information. If, for example, the measured response time exceeds the expected transponder device response time, it may be expected that the additional delay in the transponder device response time is caused by an attempt to perform a relay attack where the actually responding transponder device is not in proximity of the reader device.

In the present context, the term "reader device" may particularly denote a base station adapted for sending an electromagnetic beam for reading out a transponder device and detecting a corresponding reflected or emitted signal. The reader device may in particular be a Proximity Coupling Device (PCD) for contactless communication or be adapted as one of the group consisting of a read and/or write device, an RFID reader, a contactless chip card reader, a passive transponder, and a Near Field Communication (NFC) device.

In the present context, the term "transponder device" may particularly denote a proximity device (PD), such as a Proximity Integrated Circuit Card (PICC), an RFID tag, a smartcard or a near field communication (NFC) device. More generally, a transponder device may be a device (for instance comprising a chip) which may automatically transmit certain (e.g. coded) data when activated by a special signal from an interrogator.

In the present context, the term "expected transponder device response time" may particularly denote a predetermined response time for the transponder device, i.e. the response time which will occur at typical conditions. The "expected transponder device response time" is not necessarily particularly short, i.e. close to a minimum value, but rather well-defined. That is, the transponder device may wait for a predetermined amount of time upon receiving a command before it transmits the corresponding response.

In the present context, the term "transponder device response time" may particularly denote the actual time that passes from the transmission of a command until a corresponding response is received at the reader device.

More specifically, the transponder device response time may be determined by activating a counter or a timer in the reader device upon transmission of the last bit of the message and stopping the counter when the first bit of the corresponding response is received.

By comparing the determined transponder device response time and the expected transponder device response time, it can be determined whether the responding transponder device is actually in the proximity of the reader device.

According to an embodiment, the method further comprises (a) transmitting a second command from the reader device to the transponder device, and (b) in response to receiving the second command at the transponder device, transmitting a second response to the reader device, wherein the step of determining the actual transponder device response time comprises determining the difference in time between transmitting the second command from the reader device and receiving the second response at the reader device.

In other words, in this embodiment the actual transponder device response time is measured by exchanging a second command and a corresponding second response between the reader device and the transponder device once the reader device has received the expected transponder device response time with the first response from the transponder device.

According to a further embodiment, (a) the second command comprises at least a part of a random challenge, (b) the second response comprises at least a part of a response to the random challenge, and (c) the step of transmitting the second command and the step of transmitting the second response are repeated until the complete random challenge and the complete response to the random challenge have been transmitted.

In this embodiment, the proximity checking is carried out by measuring the round trip time of a challenge-response interaction. The preparation and transmitting of each response to the random challenge at the transponder side is expected to result in a response time very close to the expected transponder device response time.

According to a further embodiment, the method further comprises (a) transmitting a third command from the reader device to the transponder device, the third command comprising a reader message authentication code based at least on the expected transponder device response time included in the first response, (b) in response to receiving the third command at the transponder device: (b1) calculating an expected reader message authentication code based on the third command, (b2) verifying that the expected reader message authentication code equals the reader message authentication code comprised in the third command, and (c) transmitting a third response to the reader device, the third response comprising a transponder message authentication code based at least on the expected transponder device response time of the transponder device, and (c) in response to receiving the third response at the reader device: (c1) calculating an expected transponder message authentication code based on the third response, and (c2) verifying that the expected transponder message authentication code equals the transponder message authentication code comprised in the third response.

In the present context, the term "message authentication code" (or MAC) may particularly denote a short piece of information used to authenticate a message and to provide integrity and authenticity assurances on the message. Integrity assurances detect accidental and intentional message changes, while authenticity assurances affirm the message's origin. The MAC may be calculated by applying a secret cryptographic key to the message. Thereby, when the recipient applies the same secret key to the received message, the calculated MAC can be verified as long as the message has not been changed. Alternatively, the MAC may be calculated and verified by utilizing asymmetric signatures, i.e. where the reader device uses one key and the transponder device uses another key.

In other words, in this embodiment the reader device calculates a MAC (reader MAC) based on at least the expected transponder device time that was received with the first message from the transponder device and transmits this reader MAC to the transponder device as part of the third command. In response to receiving this third command, the transponder device calculates an expected reader MAC based on the received third command and verifies that the calculated expected reader MAC equals the received reader MAC. Similarly, the transponder device calculates a MAC (transponder MAC) based at least on the expected transponder device response of the transponder device and transmits this transponder MAC to the reader device as part of the third response. In response to receiving this third response, the reader device calculates an expected transponder MAC based on the received third response and verifies that the calculated expected transponder MAC equals the received transponder MAC. By respectively comparing the reader MAC and the transponder MAC with the calculated expected reader MAC and expected transponder MAC, the authenticity of the expected transponder device response time can be verified. Accordingly, if an attacker tampers with the first message to indicate another expected transponder device response time than the one actually provided by the transponder device, the proximity check will fail. According to a further embodiment, the reader message authentication code and the transponder message authentication code are further based on the random challenge and the response to the random challenge.

Thereby, the pair(s) of challenge and response is/are also authenticated. According to a further embodiment, the first message, and/or the second message, and/or the third message, and/or the first response, and/or the second response, and/or the third response comprise additional protocol communication overhead, such as message integrity fields consisting of CRC (cyclic redundancy check) or parity bits.

In general, additional header fields may be added by the communication protocol as desirable and known in the art. Furthermore, the method may comply with ISO 14443-4.

According to a further embodiment, the expected transponder device response time is stored in a memory of the transponder device, and/or the expected transponder device response time is calculated upon receipt of the first command based on at least one parameter representative of a current state of the transponder device.

In other words, the expected transponder device response time may be pre-stored in the memory of the transponder device. Alternatively, the expected transponder device response time may be calculated upon receipt of the first command, i.e. on the fly. In the latter case, the calculation is based on at least one parameter, such as a current protocol bit rate, and may optionally also use information (such as a relation between bit rate and expected response time) stored in the memory.

According to a further embodiment, the predetermined criterion is fulfilled if the actual transponder device response time does not exceed the expected transponder device response time by a predetermined amount.

In particular, the predetermined criterion may be fulfilled if the actual transponder device response time does not exceed the expected transponder device response time by more than 5% to 15%, such as by 10% of the expected transponder device response time.

According to a second aspect, there is provided a reader device for contactless communication with a transponder device, the reader device comprising (i) an antenna, (ii) a memory, and (iii) a processing unit. The processing unit is adapted to (a) transmit a first command to the transponder device, (b) receive a first response from the transponder device, the first response including an expected transponder device response time, (c) determine the actual response time of the transponder device, and (d) determine whether the determined actual transponder device response time fulfills a predetermined criterion relative to the expected transponder device response time included in the first response.

This aspect is essentially based on the same idea as the first aspect described above. More specifically, this aspect implements the method of the first aspect in a reader device, such that the reader device may determine whether a given transponder device is actually in proximity of the reader device.

According to an embodiment, the processing unit is further adapted to: (a) transmit a second command to the transponder device, (b) receive a second response from the transponder device, and (c) determine the actual transponder response time by determining the difference in time between transmitting the second command and receiving the second response.

Thus, in this embodiment the actual transponder device response time is measured by exchanging a second command and a corresponding second response between the reader device and the transponder device once the reader device has received the expected transponder device response time with the first response from the transponder device.

According to a further embodiment, (a) the second command comprises at least a part of a random challenge, (b) the second response comprises at least a part of a response to the random challenge, and (c) the processing unit is adapted to repeatedly transmit the second command and repeatedly receive the second response until the complete random challenge has been transmitted and the complete response to the random challenge has been received.

In this embodiment, the proximity checking is carried out by measuring the round trip time of a challenge-response interaction. The preparation and transmitting of each response to the random challenge at the transponder side is expected to result in a response time very close to the expected transponder device response time.

According to a further embodiment, the processing unit is further adapted to (a) transmit a third command to the transponder device, the third command comprising a reader message authentication code based at least on the expected transponder device response time included in the first response, (b) receive a third response from the transponder device, the third response comprising a transponder message authentication code based at least on the expected transponder device response time which is stored in the memory of the transponder device, (c) calculate an expected transponder message authentication code based on the third response, and (d) verify that the expected transponder message authentication code equals the transponder message authentication code comprised in the third response.

In other words, in response to receiving this third response, the reader device calculates an expected transponder MAC based on the received third response and verifies that the calculated expected transponder MAC equals the received transponder MAC.

According to a further embodiment, the predetermined criterion is fulfilled if the actual transponder device response time does not exceed the expected transponder device response time by a predetermined amount.

In particular, the predetermined criterion may be fulfilled if the actual transponder device response time does not exceed the expected transponder device response time by more than 5% to 15%, such as by 10% of the expected transponder device response time.

According to a third aspect, there is provided a transponder device for contactless communication with a reader device, the transponder device comprising (i) an antenna, (ii) a memory, and (iii) a processing unit, wherein the processing unit is adapted to (a) receive a first command from the reader device, and (b) transmit a first response to the reader device, the first response including an expected transponder device response time, such that the reader device may check whether the transponder device is in proximity of the reader device by determining whether the actual transponder device response time fulfills a predetermined criterion relative to the expected transponder device response time included in the first response.

This aspect is essentially based on the same idea as the first aspect described above. More specifically, this aspect implements the method of the first aspect in a transponder device, such that a reader device may determine whether the transponder device is actually in proximity of the reader device.

According to an embodiment, the processing unit is further adapted to (a) receive a second command from the reader device, the second command comprising at least a part of a random challenge, and (b) transmit a second response to the reader device, the second response comprising at least a part of a response to the random challenge, wherein the processing unit is adapted to repeatedly receive the second command and repeatedly transmit the second response until the complete random challenge has been received and the complete response to the random challenge has been transmitted.

In this embodiment, the proximity checking is carried out by measuring the round trip time of a challenge-response interaction. The preparation and transmitting of each response to the random challenge at the transponder side is expected to result in a response time very close to the expected transponder device response time.

According to a further embodiment, the processing unit is further adapted to (a) receive a third command from the reader device, the third command comprising a reader message authentication code based at least on the expected transponder device response time included in the first response, (b) calculate an expected reader message authentication code based on the third command, (c) verify that the expected reader message authentication code equals the reader message authentication code comprised in the third command, and (d) transmit a third response to the reader device, the third response comprising a transponder message authentication code based at least on the expected transponder device response time of the transponder device.

Thus, in response to receiving the third command, the transponder device calculates an expected reader MAC based on the received third command and verifies that the calculated expected reader MAC equals the received reader MAC.

According to a further embodiment, the expected transponder device response time is stored in a memory of the transponder device, and/or the processing unit is adapted to calculate the expected transponder device response time based on at least one parameter representative of a current state of the transponder device.

In other words, the expected transponder device response time may be pre-stored in the memory of the transponder device. Alternatively, the expected transponder device response time may be calculated upon receipt of the first command, i.e. on the fly. In the latter case, the calculation is based on at least one parameter, such as a current protocol bit rate, and may optionally also use information (such as a relation between bit rate and expected response time) stored in the memory.

According to a fourth aspect, there is provided a communication system, the system comprising (a) a reader device according to the second aspect or any of the above embodiments thereof, and (b) a transponder device according the third aspect or any of the above embodiments thereof.

It should be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present invention will be apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
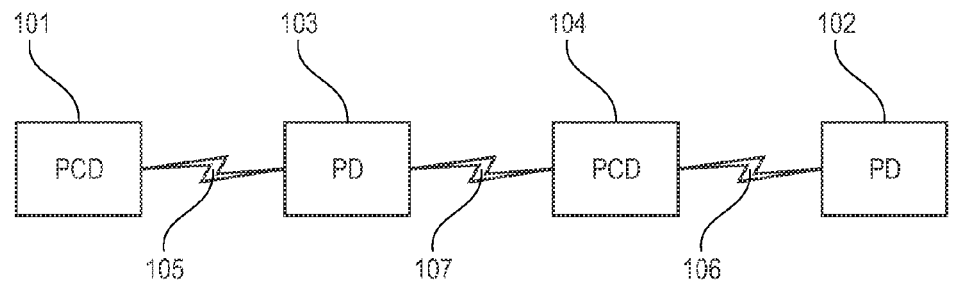
FIG. 1 shows a principal illustration of a relay attack.

The illustration in the drawing is schematic. It is noted that in different figures, similar or identical elements are provided with the same reference signs or with reference signs, which differ only within the first digit.

FIG. 1 shows a principal illustration of a relay attack. More specifically, FIG. 1 shows a legitimate reader device 101 and a legitimate transponder device 102 which are not in proximity of one another, i.e. they are not able to directly communicate via their respective contactless interfaces (not shown). The legitimate reader device 101 may e.g. be part of a cashier system at a store offering contactless payment. The legitimate transponder device 102 mag e.g. be a NFC enabled mobile telephone in the pocket of a user at some other location, such as in a public transportation vehicle, café or other public place.

FIG. 1 further shows an attacking transponder device 103 and an attacking reader device 104. As shown, the attacking transponder device 103 is in proximity of the legitimate reader device 101 and thus capable of performing contactless communication with the latter as indicated by 105. Similarly, the attacking reader device 104 is in proximity of the legitimate transponder device 102, e.g. in a pocket of an attacker sitting next to the person carrying the legitimate transponder device 102, and thus capable of performing contactless communication with the latter as indicated by 106. The attacking transponder device 103 and the attacking reader device 104 are in communication with each other via a high-bandwidth data connection, such as a mobile 3G or LTE network. Thereby, if proper measures are not taken, the attackers, i.e. the persons carrying the attacking devices 103 and 104, may be able to use a user account on the legitimate transponder device 102 to perform a payment transaction in the store where the legitimate reader device 101 is installed.

Figure 2:
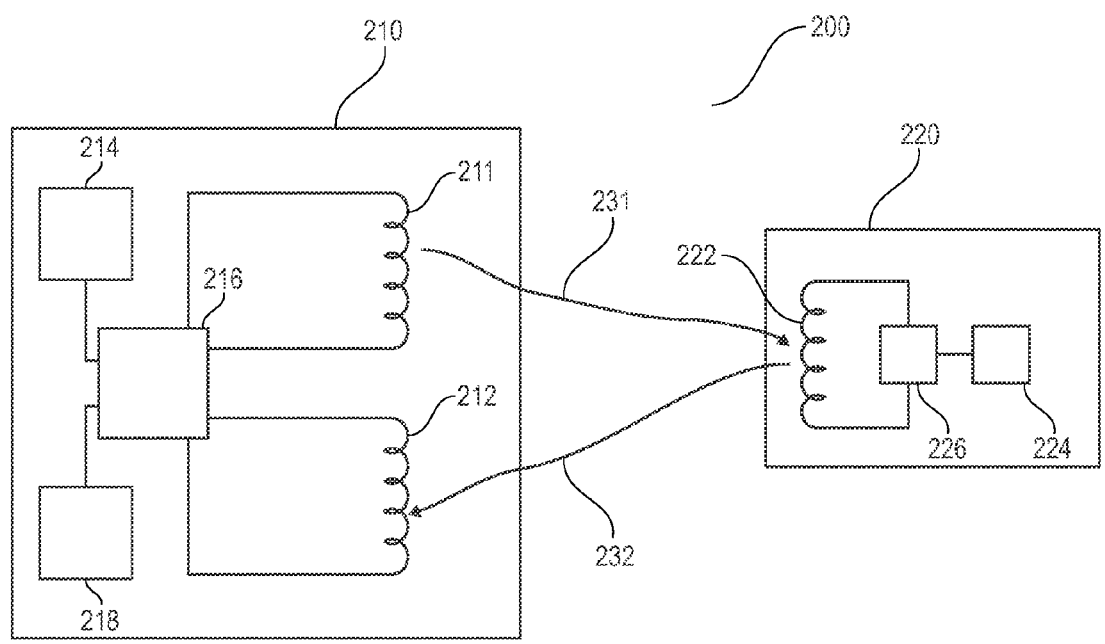
FIG. 2 shows a contactless communication system in accordance with an embodiment of the invention.

FIG. 2 shows a contactless communication system 200 in accordance with an embodiment of the invention. More specifically, the system 200 comprises a reader device 210 and a transponder device 220.

The reader device 210 comprises a transmitter antenna 211 and a receiver antenna 212 which are communicatively coupled with a reader processing unit 216, such as a microprocessor or central processing unit. The transmitter antenna 411 is capable of transmitting a communication message (command) 231 to the transponder device 220. The receiver antenna 212 is capable of receiving a communication message (response) 232 from the transponder device 220. In alternative embodiments, the transmitter antenna 211 and receiver antenna 212 may be replaced by a single common shared transceiver antenna.

The antennas 211, 212 are electrically coupled with the processor 216 so that data may be sent from the processor 216 to the transmission antenna 211 for transmission as a communication message 231. A communication message 232 received by the receiver antenna 212 may also be analyzed and processed by the processor 422.

A reader memory (storage unit) 214, such as a semiconductor memory, is coupled with the processor 216 so as to allow to store data accessible for the processor 216. Furthermore, an input/output unit 218 is shown which allows a user to operate the reader device 210. The input/output unit 218 is an optional feature that may not necessarily be included in some implementations (e.g. in reader devices for building access control or public transportation systems) and may comprise input elements such as buttons, a keypad, a joystick or the like. Via such input elements, a user may input commands to the reader device 210. Furthermore, the input/output unit 218 may comprise a display unit such as a liquid crystal display allowing display results of the reading procedure of the reader device.

As further shown in FIG. 2, the transponder device 220 comprises a transmission and receiver antenna 222, a processor 226, such as a microprocessor, and a memory 224. In an embodiment, the memory 224 and the processor 226 may be monolithically integrated in an integrated circuit (IC) which can be connected to the antenna 222 and attached to a support, such as e.g. a piece of fabric.

The communication messages 231, 232 can be exchanged in a wireless manner between the devices 210 and 220.

Figure 3:
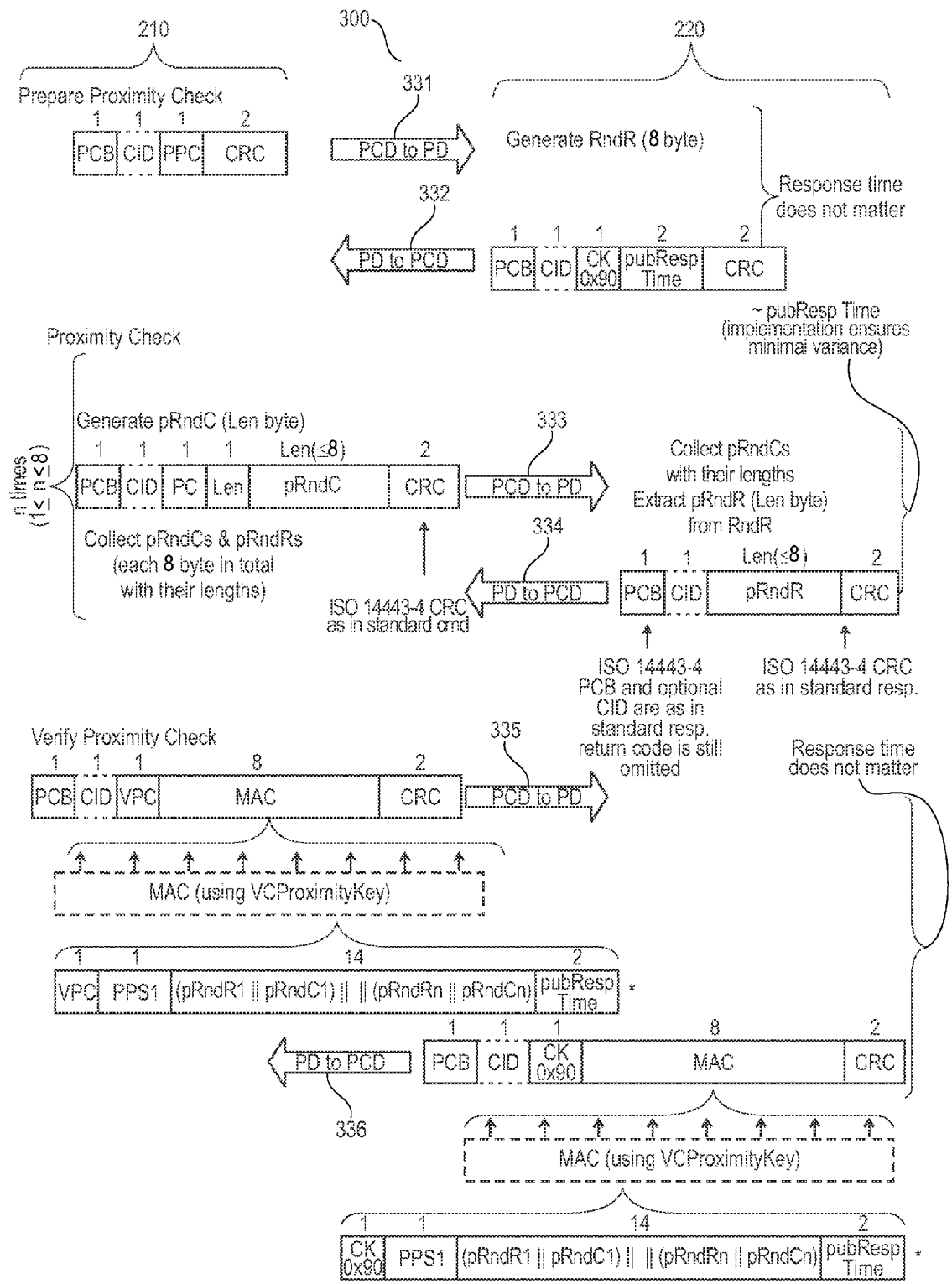
FIG. 3 shows a message flow between a reader device and a transponder device in accordance with an embodiment of the invention.

FIG. 3 shows a message flow between a reader device, such as the reader device 210 of FIG. 2, and a transponder device, such as the transponder device 220 of FIG. 2, in accordance with an embodiment of the invention.

First, as indicated by arrow 331, the reader device 210 transmits a first command (Prepare Proximity Check (PPC) command) to the transponder device 220. The transponder device responds to the PPC command by transmitting a (first) response 332 back to the reader device 210. The response 332 includes the expected response time pubRespTime stored in the memory 224 of the transponder device. Further, as shown in FIG. 3, the first response 332 may include an OK and a CRC (Cyclic Redundancy Check). Prior to or while transmitting the first response 332, the transponder device 220 generates a 7 byte random number RndR for responding to a random challenge to come from the reader device 210.

Then, the reader device 210 generates a 8 byte random challenge RndC and transmits it, at least in part pRndC, together with a CRC to the transponder device 220 as a second command (Proximity Check (PC) command) as indicated by arrow 333. Other embodiments may, depending on the circumstances, use random challenges with different lengths, such as 4, 6, 7, 10 or 12 bytes, or any other number of bytes. Upon receiving the second command 333, the transponder device 220 processes the received (partial) random challenge and prepares a corresponding second response as is known in the art. The second response is transmitted to the reader device 210 as indicated by arrow 334 such that it will be received by the reader device 210 approximately pubRespTime (with minimum variance) after the transmission of the second command 333 by the reader device 210 was completed. Now, if the transponder device 220 is not actually in the proximity of reader device 210, this transmission will be delayed, i.e. the expected response time pubRespTime will be exceeded. The transmissions of the second command 333 and the corresponding second response 334 may be repeated until the complete random challenge RndC and the complete response thereto RndR have been transmitted.

Upon completion of the exchange of random challenge and response, the processing unit 216 of the reader device 210 determines whether the actual response time matches the expected response time pubRespTime with at least a predetermined precision, e.g. it does not exceed pubRespTime by more than 10%. If this is not the case, communication with the transponder device 220 is terminated and a corresponding error message is output. If, on the other hand, the actual response time matches the expected response time pubRespTime with the required precision, the reader device 210 generates a reader MAC over the random challenges and responses and the expected response time pubRespTime received with the first response 332. The generated reader MAC and a CRC are transmitted from the reader device 210 to the transponder device 220 as a third command (Verify Proximity Check (VPC) command) as indicated by arrow 335. The transponder device 220 generates an expected reader MAC over the received third command 335 and compares is with the received reader MAC to authenticate the third command 335. Then, the transponder device 220 generates a transponder MAC over the random challenges and responses and the expected response time pubRespTime as stored in its memory 224. The transponder device 220 transmits the latter together with a CRC to the reader device 210 as a third response as indicated by arrow 336. Finally, the reader device 210 generates an expected transponder MAC over the received third response 336 and compares it with the received transponder MAC to authenticate the third response 336. If the processor 216 of the reader device 210 determines that the received third response 336 is authentic, the proximity check is deemed successful, i.e. a relay attack can be ruled out.

It is noted that, unless otherwise indicated, the use of terms such as "upper", "lower", "left", and "right" refers solely to the orientation of the corresponding drawing. It is noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:

1. A method of checking whether a transponder device is in proximity of a reader device, the method comprising:
  transmitting a first command from the reader device to the transponder device;
  in response to receiving the first command at the transponder device, transmitting a first response to the reader device, the first response including an expected transponder device response time (pubRespTime);
  determining an actual transponder device response time;
  determining whether the determined actual transponder device response time fulfills a predetermined criterion relative to the expected transponder device response time included in the first response; and
  verifying a proximity check by comparing a message authentication code (MAC) calculated based at least on the expected transponder device response time with a received MAC.

2. The method according to claim 1, further comprising:
  transmitting a second command from the reader device to the transponder device; and
  in response to receiving the second command at the transponder device, transmitting a second response to the reader device, wherein the step of determining the actual transponder device response time comprises determining a difference in time between transmitting the second command from the reader device and receiving the second response at the reader device.

3. The method according to claim 2, wherein the second command comprises at least a part (pRndC) of a random challenge (RndC), the second response comprises at least a part (pRndR) of a response (RndR) to the random challenge (RndC), and the step of transmitting the second command and the step of transmitting the second response are repeated until the complete random challenge (RndC) and the complete response (RndR) to the random challenge have been transmitted.

4. The method according to claim 1, further comprising:
  transmitting a third command from the reader device to the transponder device, the third command comprising a reader MAC based at least on the expected transponder device response time included in the first response;
  in response to receiving the third command at the transponder device: calculating an expected reader MAC based on the third command, verifying that the expected reader MAC equals the reader MAC comprised in the third command, and transmitting a third response to the reader device, the third response comprising a transponder MAC based at least on the expected transponder device response time of the transponder device; and
  in response to receiving the third response at the reader device: calculating an expected transponder MAC based on the third response, and verifying that the expected transponder MAC equals the transponder MAC comprised in the third response.

5. The method according to claim 1, wherein the expected transponder device response time is stored in a memory of the transponder device, and the expected transponder device response time is calculated upon receipt of the first command based on at least one parameter representative of a current state of the transponder device.

6. The method according to claim 1, wherein the predetermined criterion is fulfilled if the actual transponder device response time does not exceed the expected transponder device response time by a predetermined amount.

7. A reader device for contactless communication with a transponder device, the reader device comprising:
  an antenna;
  a memory; and
  a processing unit, wherein the processing unit is configured to transmit a first command to the transponder device, receive a first response from the transponder device, the first response including an expected transponder device response (pubRespTime), determine an actual response time of the transponder device, determine whether the determined actual transponder device response time fulfills a predetermined criterion relative to the expected transponder device response time included in the first response, and verify a proximity check by comparing a message authentication code (MAC) calculated based at least on the expected transponder device response time with a received MAC.

8. The reader device according to claim 7, wherein the processing unit is further configured to transmit a second command to the transponder device, receive a second response from the transponder device, and determine the actual transponder response time by determining a difference in time between transmitting the second command and receiving the second response.

9. The reader device according to claim 7, wherein the second command comprises at least a part (pRndC) of a random challenge (RndC), the second response comprises at least a part (pRndR) of a response (RndR) to the random challenge (RndC), and the processing unit is configured to repeatedly transmit the second command and repeatedly receive the second response until the complete random challenge (RndC) has been transmitted and the complete response (RndR) to the random challenge (RndC) has been received.

10. The reader device according to claim 7, wherein the processing unit is further configured to transmit a third command to the transponder device, the third command comprising a reader MAC based at least on the expected transponder device response time included in the first response, receive a third response from the transponder device, the third response comprising a transponder MAC based at least on the expected transponder device response time of the transponder device, calculate an expected transponder MAC based on the third response, and verify that the expected transponder MAC equals the transponder MAC comprised in the third response.

11. The reader device according to claim 7, wherein the predetermined criterion is fulfilled if the actual transponder device response time does not exceed the expected transponder device response time by a predetermined amount.

12. A transponder device for communication with a reader device, the transponder device comprising:
an antenna;
a memory; and
a processing unit, wherein the processing unit is configured to receive a first command from the reader device, and transmit a first response to the reader device, the first response including an expected transponder device response time (pubRespTime), such that the reader device may check whether the transponder device is in proximity of the reader device by determining whether the actual transponder device response time fulfills a predetermined criterion relative to the expected transponder device response time included in the first response and verify a proximity check by comparing a message authentication code (MAC) calculated based at least on the expected transponder device response time with a received MAC.

13. The transponder device according to claim 12, wherein the processing unit is further configured to receive a second command from the reader device, the second command comprising at least a part (pRndC) of a random challenge (RndC), and transmit a second response to the reader device, the second response comprising at least a part (pRndR) of a response (RndR) to the random challenge (RndC), wherein the processing unit is configured to repeatedly receive the second command and repeatedly transmit the second response until the complete random challenge (RndC) has been received and the complete response (RndR) to the random challenge (RndC) has been transmitted.

14. The transponder device according to claim 12, wherein the processing unit is further configured to receive a third command from the reader device, the third command comprising a reader MAC based at least on the expected transponder device response time included in the first response, calculate an expected reader MAC based on the third command, verify that the expected reader MAC equals the reader MAC comprised in the third command, and transmit a third response to the reader device, the third response comprising a transponder MAC based at least on the expected transponder device response time of the transponder device.

15. The transponder device according to claim 12, wherein the expected transponder device response time is stored in a memory of the transponder device, and the processing unit is configured to calculate the expected transponder device response time based on at least one parameter representative of a current state of the transponder device.

16. A communication system, the system comprising the reader device according to claim 7, and a transponder device.

* * * * *